United States Patent [19]

Niimura et al.

[11] Patent Number: 5,101,410
[45] Date of Patent: Mar. 31, 1992

[54] DATA TRANSMISSION SYSTEM FOR A PORTABLE DATA STORAGE MEDIUM

[75] Inventors: Takashi Niimura, Yokohama; Ryouichi Kuriyama, Yokosuka, both of Japan

[73] Assignee: Kabushiki Kaisha Toshiba, Kawasaki, Japan

[21] Appl. No.: 395,796

[22] Filed: Aug. 18, 1989

[30] Foreign Application Priority Data

Aug. 19, 1988 [JP] Japan .................................. 63-206089

[51] Int. Cl.⁵ .............................................. G06K 5/00
[52] U.S. Cl. .................................. 371/29.1; 235/380; 235/437; 902/38; 902/39
[58] Field of Search ................. 371/29.1; 340/825.06, 340/825.15; 235/380, 381, 382, 437; 902/26, 38, 39

[56] References Cited

U.S. PATENT DOCUMENTS

| | | | |
|---|---|---|---|
| 4,760,575 | 7/1988 | Watanabe | 371/21.2 |
| 4,780,602 | 10/1988 | Kawana et al. | 235/380 |
| 4,845,717 | 7/1989 | Iijima | 235/437 |
| 4,902,882 | 2/1990 | Lavelle | 235/382 |
| 4,908,502 | 3/1990 | Jackson | 235/437 |
| 4,930,129 | 5/1990 | Takahira | 371/40.4 |
| 4,965,802 | 10/1990 | Shinagawa | 235/380 |

Primary Examiner—Charles E. Atkinson
Attorney, Agent, or Firm—Cushman, Darby & Cushman

[57] ABSTRACT

A data transmission arrangement for a portable data storage medium, in which messages are transmitted between an external device and a portable data storage medium at a plurality of times in response to one readout command output from the external device. When malfunction occurs during the processing in the portable data storage medium, the portable data storage medium outputs an abnormality response to the external device, and then receives a continuous data demand command from the external device. Thereafter, a status data different from the status data included in the first message is sent from the portable data storage medium to the external device. The external device recognizes this sent status data. Thereafter, the data transmission started in response to one readout command is not discontinued and additional data continuous to be transmitted.

14 Claims, 8 Drawing Sheets

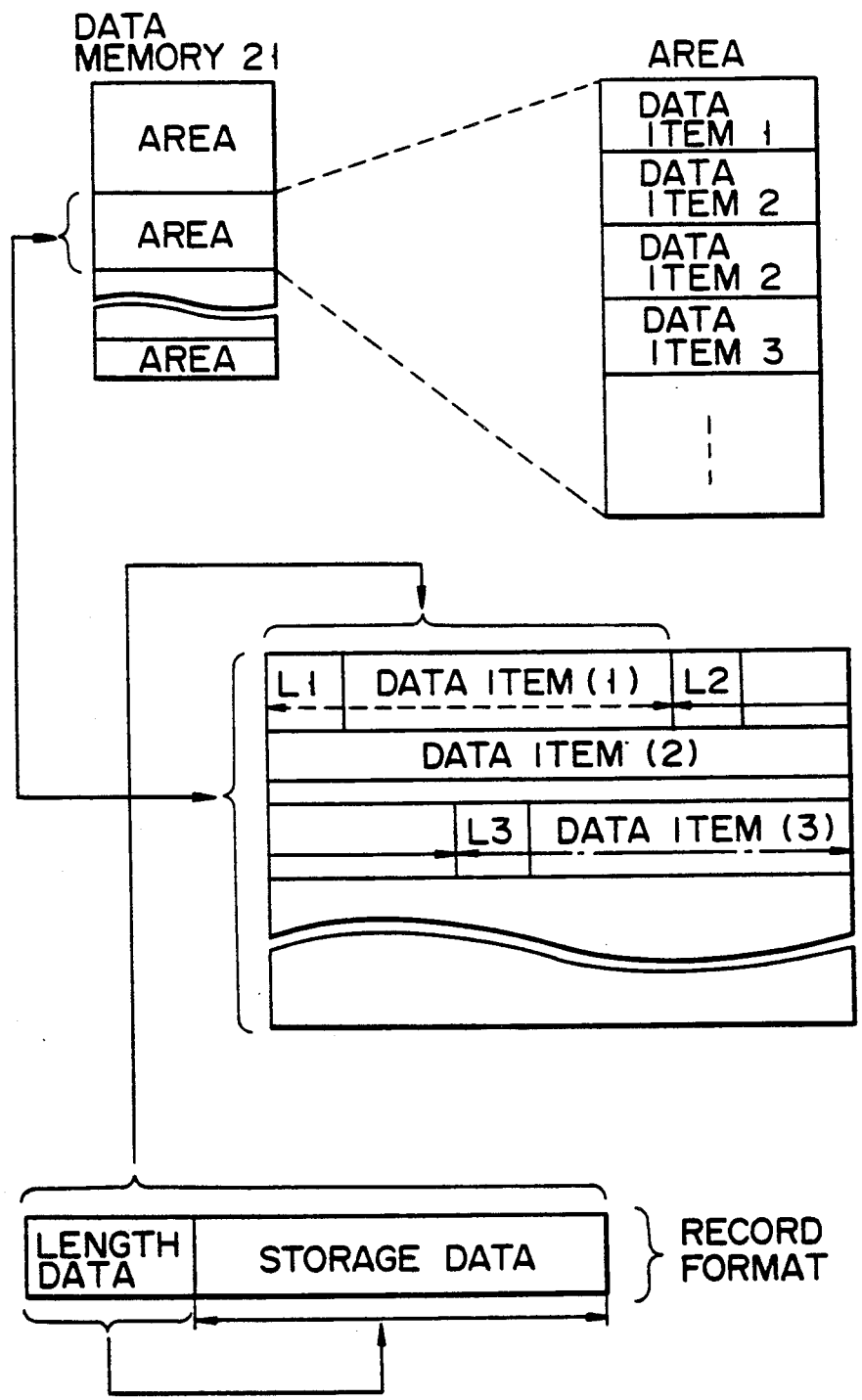
F I G. 1

FIG. 2

| MESSAGE START DATA | DATA SECTION | MESSAGE END DATA |
|---|---|---|

FIG. 3A

| MESSAGE START DATA | EXECUTION COMMAND DATA | EXECUTION RESULT DATA | MESSAGE LENGTH (L1) | DATA ITEM 1 (1) | MESSAGE END DATA | FIRST RESPONSE MESSAGE |
|---|---|---|---|---|---|---|

FIG. 3B

| MESSAGE START DATA | DATA ITEM 1 (2) | MESSAGE END DATA | SECOND RESPONSE MESSAGE |
|---|---|---|---|

FIG. 3C

| MESSAGE START DATA | DATA ITEM 1 (3) | MESSAGE END DATA | THIRD RESPONSE MESSAGE |
|---|---|---|---|

FIG. 3D

| MESSAGE START DATA | DATA ITEM 1 (4) | MESSAGE END DATA | FOURTH RESPONSE MESSAGE |
|---|---|---|---|

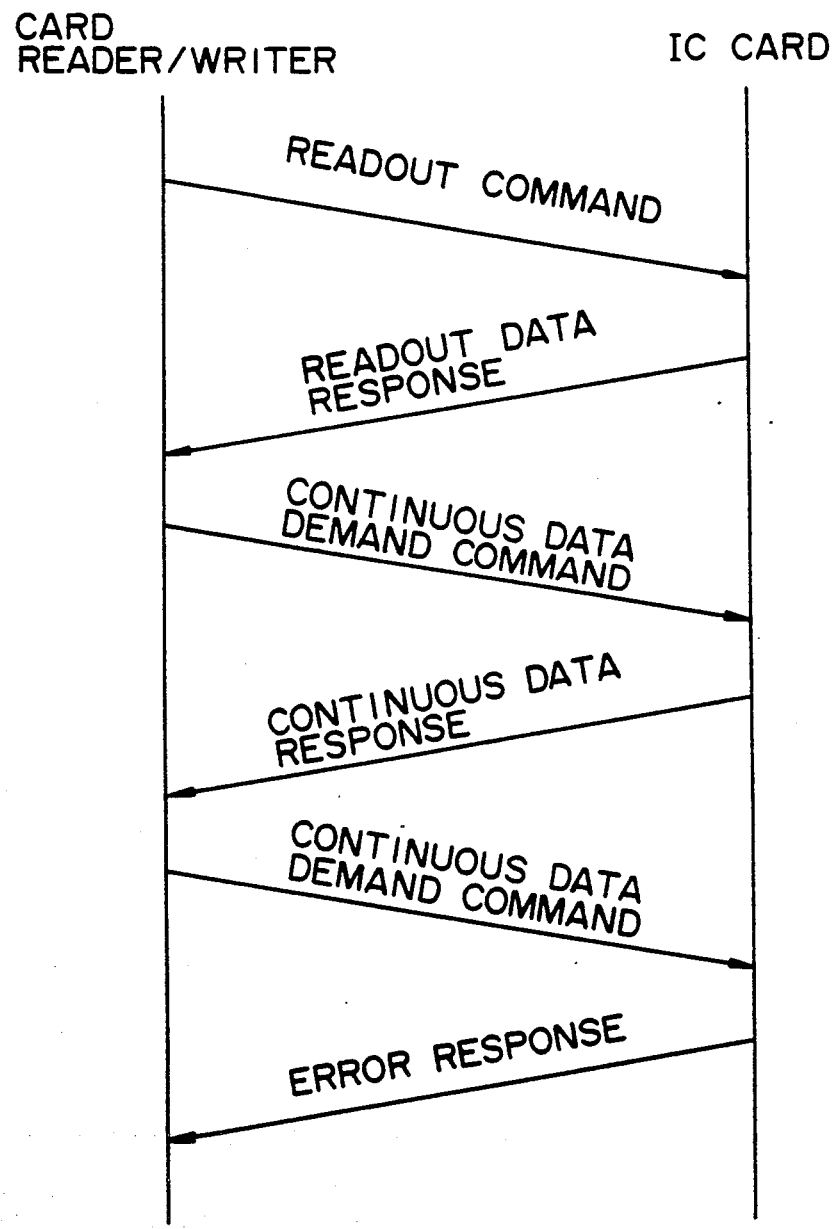
F I G. 4

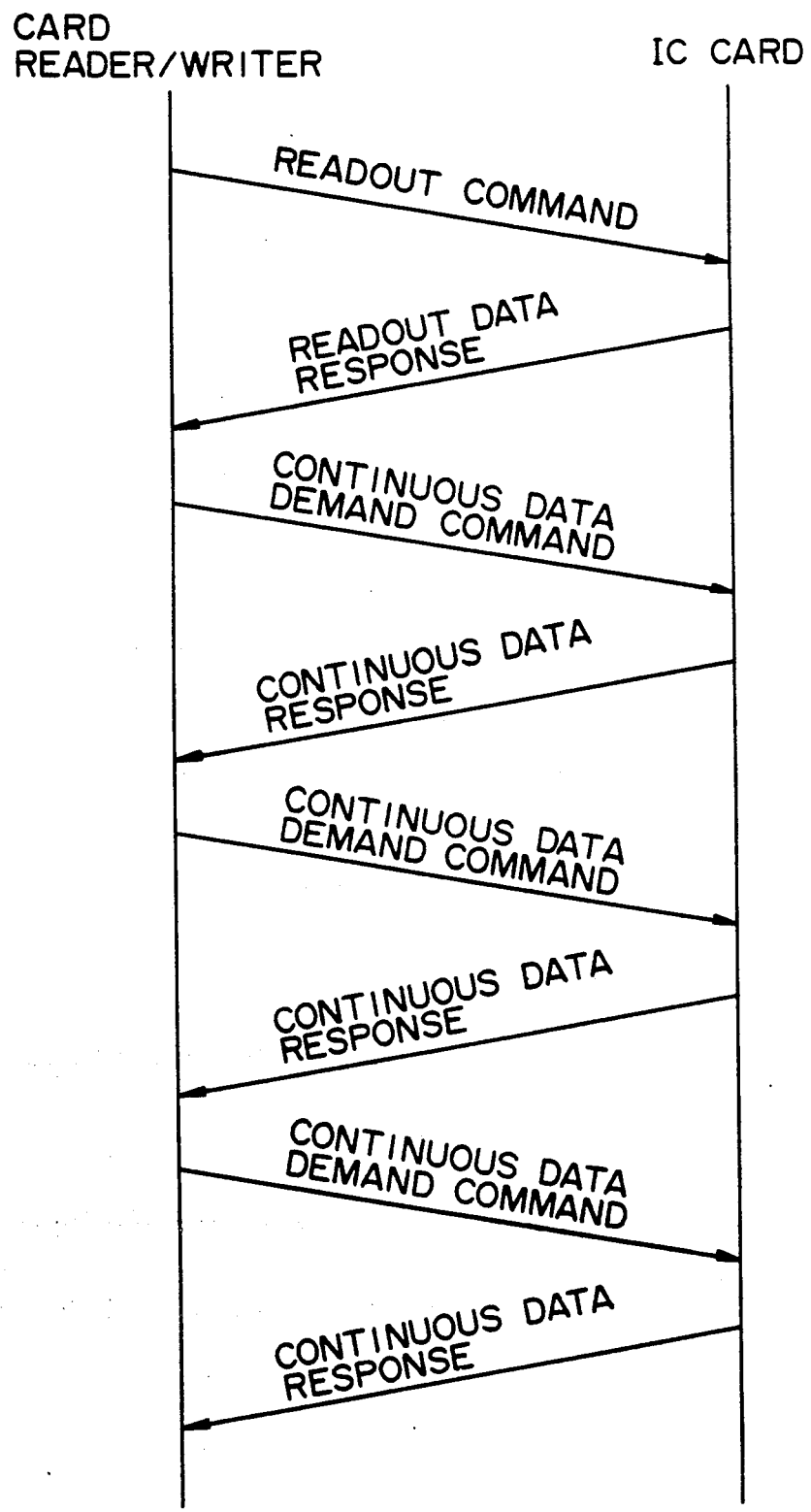
F I G. 7

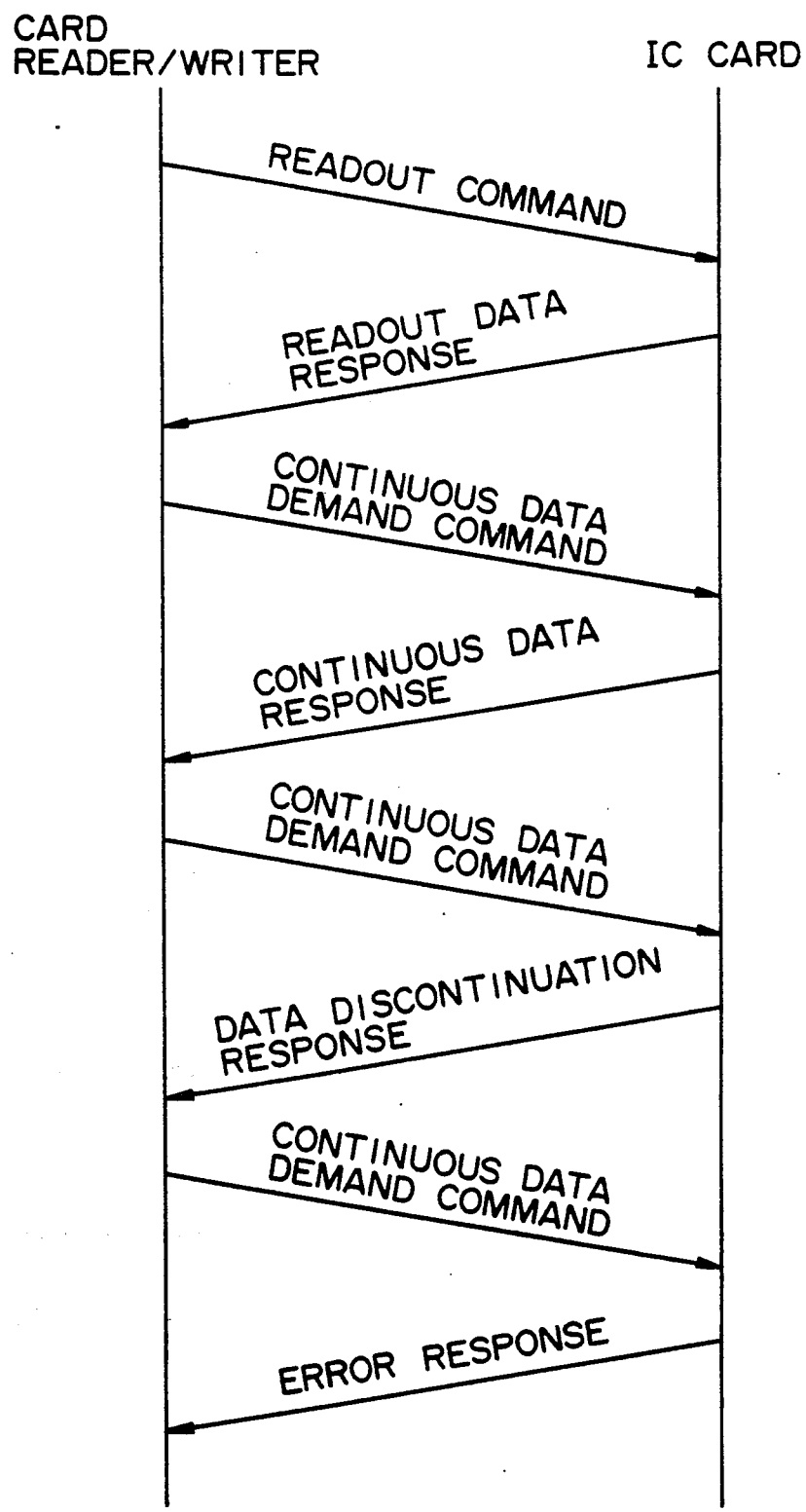
F I G. 8

DATA TRANSMISSION SYSTEM FOR A PORTABLE DATA STORAGE MEDIUM

BACKGROUND OF THE INVENTION

1. Field of the Invention

The present invention relates to an improvement of a data transmission arrangement (apparatus and method) for data transmission between a portable electronic device such as an IC card and an external device.

2. Description of the Related Art

Recently, an IC card has been developed as a new type of portable data storing medium. The IC card contains an IC chip having a non-volatile memory section and a control section such as a CPU for controlling the memory section. As shown in FIG. 1, a data memory 21 built in this type of IC card has a plurality of areas having different storage capacities, and each area contains a plurality of record data items. Depending on the types of application software, the areas are divided, and the record data items are divided as units of data.

The IC card receives a storage demand data item from a card reader/writer serving as an external device. In this case, a data item to be stored is handled as a unit of a record data item.

The record data item is called a "record format". The record format consists of a length data item, which indicates the length of a storage data item, and the storage data corresponding to the the length data item.

The IC card has a function for storing a record format as it is, and a function for outputting the record format in response to a readout demand. A record data item to be retrieved is recognized and selected from among the record data items stored in a predetermined area of the data memory 21. On the other hand, the card reader/writer has the function for recognizing the record data item output from the data memory 21.

The amount of a message to be processed in a single transmission operation between the IC card and the card reader/writer is limited by the capacity of a buffer memory (not shown), for the input/output of the IC card, and by transmission regulations. Depending on the capacity and the contents of the regulations, several transmission operations may be required for the processing of one record.

For example, in an IC card using a text format protocol consisting of a message start data (message start code), a data section and a message end data (message check code), as shown in FIG. 2, when the IC card receives a record readout command consisting of a data item 1 which is so large that it cannot be transmitted in one transmission operation, then its length data L1, the data item 1 is transmitted in the form of four response message components.

As shown in FIGS. 3A to 3D, a first response message consisting of a message start data item, a currently executed command (readout command), a record readout status data item or an executed result (normal readout of a target record data item), a length data item L1, a data section 1(1), and a message end data item. Each of second to fourth response messages consists of a message start data item, a data section 1(2), (1(3),or 1(4)), and a message end data item.

The status data item represents, as a response to the record data readout command, the meaning "normal readout of a target data item", "a target record data item is not present", or "message format does not correspond to a record readout command".

The card reader/writer evaluates the length of the target record data item, based on the length data L1 in the first response message from the IC card, as shown in FIG. 3, and performs the processing corresponding to the length of the target record data item.

Normally, when the IC card receives a readout command, it transmits the first to fourth response messages. It is supposed that the data readout is not smoothly performed and the transmission of data items is discontinued. In this case, as shown in FIG. 4, the IC card outputs an error response (or a record data item discontinuation response) to the card reader/writer in response to a continuous data demand command from the card reader/writer. Since the card reader/writer has received a status data item indicating "normal readout", which is included in the first message, the card reader/writer erroneously receives the record data item discontinuation response as a continuous record data item.

In order to avoid the erroneous operation of the card reader/writer, when data discontinuation occurs, the output of a sequence of output messages is at once stopped. Next, a continuation end data item is superimposed on a message start data item of the last record data item which can be readout. When the card reader/writer receives the continuation end data item, it concludes that the output of data has stopped before all record data items are readout. Also, as shown in FIG. 5, the card reader/writer outputs a status data demand command to the IC card. Thus, the card reader/writer is required to output the status data demand command, though it could repeat the output of only continuous data demand commands if the transmission of data were normally continued.

This being the case, the conventional system has the following problem. Namely, where a plurality of messages corresponding to one command are transmitted between a card reader/writer and an IC card, even if a status data item, which is different from the status data item included in the first message, is output from the IC card to the card reader/writer, the card reader/writer cannot recognize it. If the card reader/writer is forcibly made to recognize the status data item, the transmission of data is discontinued.

SUMMARY OF THE INVENTION

The present invention solves the above problem associated with a conventional system. This invention provides a data transmission system for a portable electronic device wherein a plurality of messages corresponding to one command are transmitted between an external device and a portable electronic device (portable memory medium). According to this invention, even if a status data item, which is different from the status data item included in the first message, is output from the portable electronic device to the external device, the external device can recognize the status data item which is different from that in the first message. In this case, the transmission of messages corresponding to one command is not discontinued.

In order to achieve the above object, a data transmission system for a portable electronic device, according to the present invention, comprises:

a portable electronic device having a data memory, and a control element for reading out from the data memory; and an external device for sending a data readout command message to the portable electronic device, and receiving a response massage from the portable electronic device.

Data is transmitted between the portable electronic device and the external device is performed by the following steps;

a first transmission step in which a readout command message is supplied from the external device to the portable electronic device, and a status data item representative of the result of processing started in response to the readout command message and a data item read out from the data memory ar output from the portable electronic device to the external device;

a second transmission step in which the external device transmits a continuous data demand command to said portable electronic device, when the external device judges that there is a continuous data item from the data sent to the external device in the first transmission step;

a third transmission step in which the portable electronic device, which has received the continuous data demand command from the external device in the second transmission step, outputs a data item remaining in the data memory to the external device;

a fourth transmission step in which an abnormality response is output from the portable electronic device to the external device, when an abnormality occurs during the processing in the portable electronic device which has been started in response to the readout command message; and a fifth transmission step in which, subsequent to the abnormality response output when the abnormality occurred in the fourth transmission step, a status data item different from a status data item output at the time of normal readout is output from the portable electronic device to the external device.

In the data transmission system for a portable electronic device, which has the above structure, when a plurality of messages need to be transmitted for one command between an external device and a portable electronic device, even if a status data item, which is different from that included the first message, is output from the portable electronic device to the external device, the external device can recognize the status data item different from that in the first message. In this case, the transmission of data for one command is not discontinued.

BRIEF DESCRIPTION OF THE DRAWINGS

FIG. 1 shows an example of a structure of a data memory included in an IC card used in the present invention, and an example of a record format;

FIG. 2 shows an example of a message format used in the IC card and a card reader/writer used in the present invention;

FIGS. 3A to 3D show examples of structures of response messages which are transmitted sequentially in response to one command;

FIGS. 4 and 5 schematically show conventional transmission sequences of commands and responses between a card reader/writer and an IC card;

FIG. 7 schematically shows a transmission sequence of commands and responses, when the IC card functions normally;

FIG. 8 schematically shows a transmission sequence of commands and responses, when the IC card malfunctions during processing in response to the command from the card reader/writer in the system of the present invention.

DETAILED DESCRIPTION OF THE PREFERRED EMBODIMENTS

An embodiment of the data transmission system for a portable electronic device, according to the present invention, will now be described with reference to the accompanying drawings.

Figure 5:
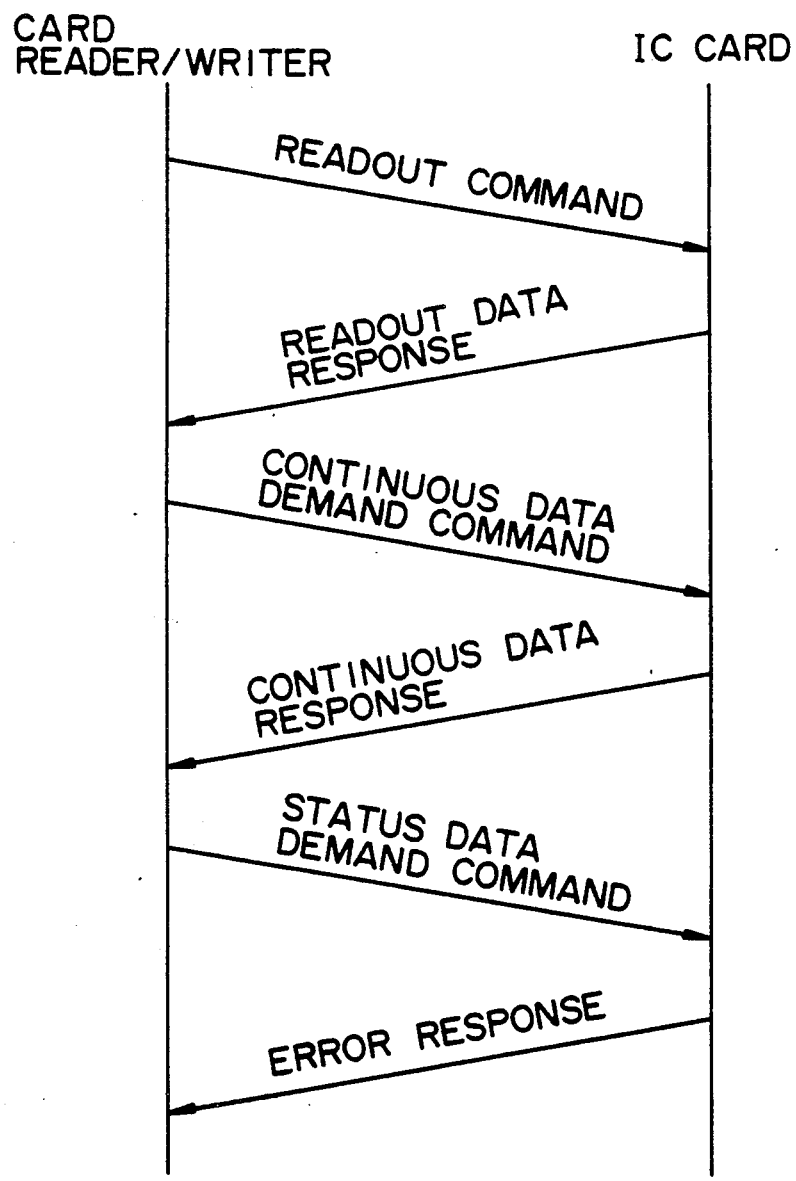
Figure 6A:
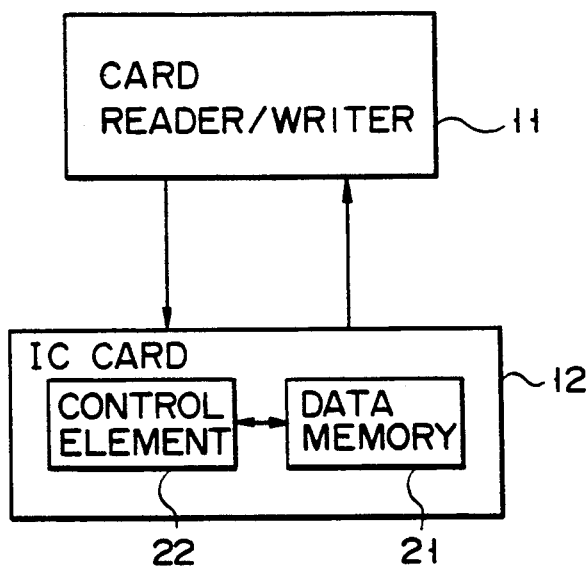
FIG. 6A shows a structure of the IC card used in the present invention, and the card reader/writer connected to the IC card.
Figure 6B:
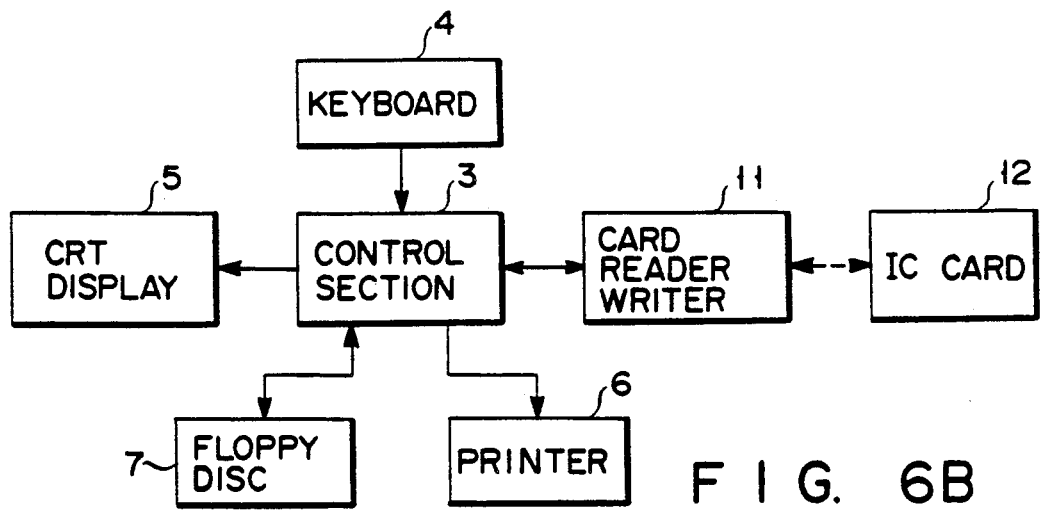
FIG. 6B shows a structure of an IC card serving as the portable electronic device according to the present invention and a structure of a terminal device for handling the IC card.
Figure 6C:
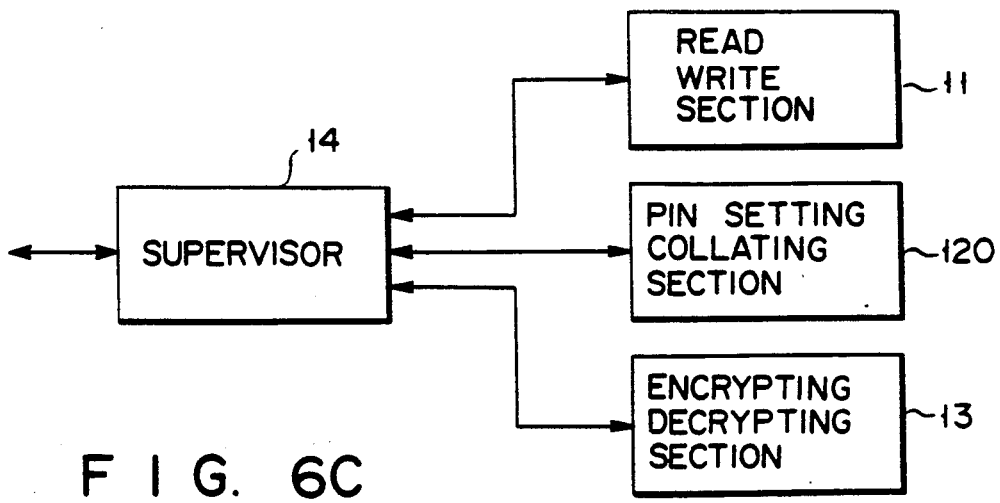
FIG. 6C shows a block diagram illustrating the function of the portable electronic device of the invention.

FIG. 6A is a block diagram showing a structure of a portable electronic device used in the present invention, which comprises a card reader/writer 11 and an IC card (portable memory medium) 12. FIG. 6B shows a structure of an IC card serving as the portable electronic device of the present invention and a structure of a terminal device for handling the IC card. An IC card 12 can be connected to a control section 3 such as a CPU through a card reader/writer 11, and the control section 3 is connected to a keyboard 4, a CRT display 5, a printer 6 and a floppy disc device 7. The IC card 12 is owned by a user, and it stores key data (PIN) known only by the user, which is collated in buying goods, and other necessary data. FIG. 6C shows functional blocks of the IC card. The IC card comprises a read/write section 11, a PIN setting/collating section 120 and an encrypting/decrypting section section 13, which execute basic functions, and a supervisor 14 for supervising these functions.

The read/write section 11 performs readout, write-in or erasure of data with respect to a data memory 16.

The PIN setting/collating section 120 performs storing of a user's PIN and readout prohibition processing. After the PIN has been set, the PIN setting/collating section 120 collates the PIN, thus allowing subsequent processing.

The encrypting/decrypting section 13 encrypts communication data for preventing the data from being leaked or counterfeited when the data is transmitted from the control section 3 to other terminal device, for example, via a communication line. Also, the encrypting/decrypting section 13 decrypts the encrypted data. The encrypting/decrypting section 13 processes data based on a encrypting algorism having cryptogrammic efficiency, such as DES (Data Encryption Standard).

The supervisor 14 decrypts a function code or a function code accompanied with data, which is supplied from the card read/write 11 and performs a necessary function.

Figure 6D:
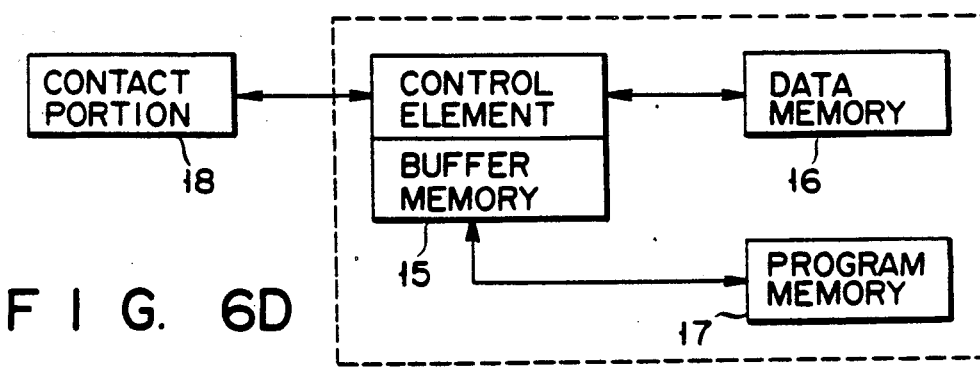
FIG. 6D shows an example of a structure of the IC card serving as the portable electronic device of the invention.

In order to perform the above functions, the IC card 12 comprises, as shown in FIG. 6D, a control element 15 such as a CPU, a data memory 16, a program memory 17, and a contact portion 18 for electrical contact with the card reader/writer 11. The control element 15, data memory 16, and program memory 17 are integrated on a single IC chip (or a plurality of chips) and embedded in the IC card body.

The program memory 17 is formed, for example, as a mask ROM, and stores a control program of the control element 15 which is provided with sub-routines for achieving the above basic functions.

The data memory 16 is used for storing various data items, and is composed, for example, of an erasable non-volatile memory such as an EEPROM (electrically erasable and programmable ROM).

The data transmission between the card reader/writer 11 and the IC card 12 is performed such that a plurality of messages are read out from the IC card 12 in response to a specific record data readout command fed from the card reader/writer 11.

In other words, the card reader/writer 11 outputs command messages to the IC card 12 and receives response messages from the IC card 12.

The IC card 12 includes a data memory 21 and a control element (CPU) 22.

Figure 9:
FIG. 9 shows an example of a structure of a delimiter serving as a data discontinuation response to be supplied from the IC card to the card reader/writer, when the IC card malfunctions in the system of the present invention.

The message transmitted between the IC card 12 and the card reader/writer 11 has a structure as shown in FIGS. 3A to 3D. A detailed description thereof may be omitted. However, it should be noted that a delimiter message (described later) consists only of a message start code and a message check code, and does not include a memory data, as shown in FIG. 9.

Transmission of messages between the IC card 12 and the card reader/writer 11 in the portable electronic device having the above structure will now be described.

FIG. 7 shows a message transmission sequence in the normal condition. A readout command message is transmitted from the card reader/writer 11 to the IC card 12. In response to the readout command message, the IC card 12 outputs to the card reader/writer 11 a readout data response (first response message) as shown in FIG. 3A, which consists of a memory data item 1(1), which is a portion of a record data item designated by the readout command message and dividedly stored in the data memory 21 (FIG. 1), a message length L1, a status data item (indicating the normal readout of target record data), and a message start code added to the top of the first response message, and a message check code added to the end of the first response message.

The card reader/writer 11 compares the message length L1 and the length of memory data 1(1) included in the first readout data response message, to judge whether or not there is additional data. If there is additional data, the card reader/writer 11 transmits a continuous data demand command to the IC card 12. Responding to the continuous data demand command, the IC card 12 outputs to the card reader/writer 11 a continuous data response message (second response message) as shown in FIG. 3(B), which consists of a memory data 1(2) (a second portion of the target record data), a message start code, and a message check code.

Then, upon receiving the continuous data response message from the IC card 12, the card reader/writer 11 compares the message length L1 included in the readout data response with the total length of the memory data 1(1) and memory data 1(2), thereby to judge whether or not these is additional data. If there is additional data, the card reader/writer 11 transmits a continuous data demand command to the IC card 12. Responding to the continuous data demand command, the IC card 12 outputs to the card reader/writer 11 a continuous data response message (third response message) as shown in FIG. 3(C), which consists of a memory data 1(3) (a third portion of the target record data), a message start code, and a message check code.

Upon receiving the continuous data response message from the IC card 12, the card reader/writer 11 compares the message length L1 included in the readout data response with the total length of the memory data 1(1), memory data 1(2) and memory data 1(3), thereby to judge whether or not additional data is needed. If there is additional data, the card reader/writer 11 transmits a continuous data demand command to the IC card 12. Responding to the continuous data demand command, the IC card 12 outputs to the card reader/writer 11 a continuous data response message (fourth response message) as shown in FIG. 3(D), which consists of a memory data 1(4) (a fourth portion of the target record data), a message start code, and a message check code.

Then, upon receiving the continuous data response message from the IC card 12, the card reader/writer 11 compares the message length L1 included in the readout data response with the total length of the memory data 1(1), memory data 1(2), memory data 1(3) and memory data 1(4), thereby to judge whether or not additional data is needed. If there is no more additional data, the card reader/writer 11 does not transmit a continuous data demand command to the IC card 12 and the processing is completed.

Message transmission in the case where a transmission error or a data discontinuation occurs in the IC card during the processing responding to the readout command from the card reader/writer will now be described with reference to FIG. 8. A readout command message is output from the card reader/writer 11 to the IC card 12. Upon receiving the readout command message, the IC card 12 outputs to the card reader/writer 11 a readout data response (first message) as shown in FIG. 3A, which consists of a memory data item 1(1), which is a portion of a record data item designated by the readout command message and dividedly stored in the data memory 21 (FIG. 1), a message length L1 of the designated record data item, a status data item (indicating the normal readout of target record data), and a message start code added to the top of the first response message, and a message check code added to the end of the first response message.

The card reader/writer 11 compares the message length L1 and the length of memory data 1(1) included in the first readout data response message, to judge whether or not there is additional data. If there is additional data, the card reader/writer 11 transmits a continuous data demand command to the IC card 12. Responding to the continuous data demand command, the IC card 12 outputs to the card reader/writer 11 a continuous data response message (second message) as shown in FIG. 3(B), which consists of a memory data 1(2) (a second portion of the target record data), a message start code, and a message check code.

Then, upon receiving the continuous data response message from the IC card 12, the card reader/writer 11 compares the message length L1 included in the readout data response with the total length of the memory data 1(1) and memory data 1(2), thereby to judge whether or not there is additional data. If there is additional data, the card reader/writer 11 transmits a continuous data demand command to the IC card 12.

Responding to the continuous data demand command, a memory data item following the memory data item 1(2) is read out from the data memory 21 of the IC card 12 in response to the target record data. In this case, if the IC card 12 judges the occurrence of data discontinuation and fails to read out the memory data item following the memory data item 1(2) before the completion of the message length L1 of the designated record data, then the IC card 12 outputs to the card reader/writer 11 a data discontinuation response (or a delimiter message for separating the message including the record data and the message including the status data) as shown in FIG. 9, which consists of the message start code and the message check code and does not include a memory data item. The message start code of the delimiter message representing the data discontinuation response indicates that the processing responding to the readout command is continuing.

The card reader/writer 11 judges the data discontinuation response fed from the IC card to be the delimiter message, from the fact that the data discontinuation response does not include a memory data item, and recognizes the status data sent from the IC card 12 in response to the next continuous data demand command from the card reader/writer 11. After recognizing the end of the memory data and the continuation of transmission, the card reader/writer 11 sends a continuation data demand command once again to the IC card 12. Upon receiving the continuation data demand command, the IC card 12 outputs to the card reader/writer 11 an error response consisting of a status data representative of data discontinuation, a message start code and a message check code. The message start data in the error response indicates the end of message transmission started in response to the readout command. Upon receiving the error response from the IC card 12, the card reader/writer 11 completes the message transmission started by the output of the readout command.

As described above, in the present invention, the delimiter message separates the message including the record data and the message including the status data. Thus, in the system wherein a plurality of messages are transmitted in response to one command, even if a status data different from the status data included in the first message is output, the card reader/writer can recognize the status data different from that in the first message. In this case, the data transmission started in response to one command is not discontinued.

Suppose that the IC card 12 receives an "all record readout command" from the IC card reader/writer 11, which demands readout of all data from the data memory 21, and the contents of the data memory 21 consist of three records, i.e., L1+data (1), L2+data (2) and L3+data (3), as shown in FIG. 1. At the time of readout of record "L1+data (1)", if all length data (1) indicated by L1 cannot be read out, the IC card 12 supplies an abnormality message or an error response to the IC card reader/writer 11, based on the above process. In this case, the error response indicates continuation of communication. Since the error response relating to the record "L1+data(1)" has been sent from the IC card to the IC card reader/writer 11 in the data transmission continuation state, the IC card reader/writer 11 delivers a continuous data demand command to the IC card 12. Thus, the IC card 12 can execute the readout of subsequent record "L2+data(2)". As stated above, regarding the abnormality occurring in the readout of records "L1+data(1)" and "L2+data(2)", the IC card supplies a status signal in the form of delimiter message to the IC card reader/writer 11, and the IC card delivers the error response to the card reader/writer in the transmission continuous state. Thus, while the IC card reader/writer 11 is being informed of the readout abnormality, the IC card 12 can read out the rest of the data, without interrupting the data transmission.

What is claimed is:

1. A data transmission system for a portable data storage medium, comprising:

a portable data storage medium having a data memory, and a control element for reading out data from the data memory; and an external device for sending a data readout command message to the portable data storage medium, and receiving a response message from the portable data storage medium, means for transmitting data between the portable data storage medium and said external device, said means including:

first means for transmitting a readout command message from the external device to the portable data storage medium, and a status data item representative of the result of processing started in response to the readout command message and a data item read out from said data memory are output from the portable data storage medium to the external device;

second means for second transmitting from said external device a continuous data demand command to said portable data storage medium, when the external device judges that there is additional data sent to the external device after the first transmission step;

third means for outputting from the portable data storage medium, which has received the continuous data demand command from the external device, a data item remaining in the data memory to the external device;

fourth means for transmitting an abnormality response from the portable data storage medium to the external device, when an abnormality occurs during the processing in the portable data storage medium which has been started in response to the readout command message; and fifth means for transmitting, subsequent to the abnormality response output when the abnormality occurred a status data item different from a status data item output at the time of normal readout is output from the portable data storage medium to the external device.

2. The system according to claim 1, wherein the portable data storage medium comprises an IC card, and the external device comprises a card reader/writer.

3. The system according to claim 1, wherein the abnormality response is a delimiter message comprising a message start data and a message end data.

4. The system according to claim 1, wherein the second transmitting means includes means for comparing a message length data item, which is included in a response message output of the first transmitting means, with the length of a memory data item, thereby to judge the presence of an additional data.

5. A data transmission system for a portable data storage medium which reads out data from a data memory in response to a readout command from an external device and supplies the readout data to the external device, and also which transmits additional data based on a continuous data demand command fed from the external device, the system including:

means for outputting an abnormality response or a delimiter message from the portable data storage medium to the external device, when an abnormality occurs during the readout of the additional data, in response to the continuous data demand command from the external device; and means for outputting, subsequent to the outputting of the delimiter message, an abnormal status data item from the portable data storage medium to the external device.

6. A data transmission system for a portable data storage medium, comprising:

a portable data storage medium having a data memory;

a temporary memory for temporarily storing data read out from the data memory;

an external device for transmitting a command message to the portable data storage medium and receiving a response message from the portable data storage medium; and a control section for controlling the readout of data from the data memory and the transmission of data in the temporary memory to the external device, and means for transmitting data between the portable data storage medium and the external device, said including:

first means for transmitting in which data is read out from the data memory in response to a readout command message supplied from the external device, and a status data item representative of the result of the readout, a data item representation of data length and a data item read out from the data memory are transmitted to the external device via the temporary memory;

second means for transmitting in which a continuous data demand command is transmitted to the portable data storage medium, when the external device judges that there is a continuous data item from the data sent to the external device in the first transmitting and from the data item representative data length;

third means for transmitting in which the portable data storage medium, which has received the continuous data demand command from the external device in the second means for transmitting, reads out a continuous data item from the data memory and transmits the readout data to the external device via the temporary memory;

fourth means for transmitting a data discontinuation message is output from the portable data storage medium to the external device, when an abnormality occurs during the readout from the data memory in the third transmitting; and fifth means for transmitting in which, subsequent to the data discontinuation message output in the fourth transmitting, a status data item different from a status data item output at the time of normal readout is output from the portable data storage medium to the external device.

7. The system according to claim 6, wherein the portable data storage medium comprises an IC card, and the external device comprises a card reader/writer.

8. The system according to claim 6, wherein the data discontinuation message comprises a message start data item, a data item and a message end data item, and the abnormality response is a delimiter message consisting of a message start data and a message end data.

9. In a data transmission system for a portable data storage medium, comprising a portable data storage medium having a data memory, and a control element for reading out data from the data memory, and an external device for sending a data readout command message to the portable data storage medium, and receiving a response message from the portable electronic device, a method for data transmitting between the portable data storage medium and the external device is performed by a process comprising the steps of:

a first transmission step in which a readout command message is supplied external device to the portable data storage medium, and a status data item representative of the result of processing started in response to the readout command message and a data item read out from the data memory are output from the portable data storage medium to the external device;

a second transmission step in which the external device transmits a continuous data demand command to said portable data storage medium, when the external device judges that there is a continuous data item from the data sent to the external device in the first transmission step;

a third transmission step in which the portable data storage medium, which has received the continuous data demand command from the external device in the second transmission step, outputs a data item remaining in the data memory to the external device;

a fourth transmission step in which an abnormality response is output from the portable data storage medium to the external device, when an abnormality occurs during the processing in the portable data storage medium which has been started in response to the readout command message; and a fifth transmission step in which, subsequent to the abnormality response output when the abnormality occurred in the fourth transmission step, a status data item different from a status data item output at the time of normal readout is output from the portable data storage medium to the external device.

10. The method according to claim 9, wherein the abnormality response is a delimiter message consisting of a message start data and a message end data.

11. The method according to claim 9, wherein the second transmission step includes a step of comparing a message length data item, which is included in a response message output in the first transmission step, with the length of a memory data item, thereby to judge the presence of a continuous data item.

12. A method for data transmission for a portable data storage medium which reads out data from a data memory in response to a readout command from an external device and supplies the readout data to the external device, and also which transmits continuous data based on a continuous data demand command fed from the external device, comprising the steps of:

a first step in which an abnormality response or a delimiter message is output from the portable data storage medium to the external device, when an abnormality occurs during the readout of the continuous data, in response to the continuous data demand command from the external device; and a second step in which, subsequent to the step of outputting the delimiter message, an abnormal status data item is output from the portable data storage medium to the external device.

13. In a data transmission for a portable data electronic device, including a portable data storage medium having a data memory, a temporary memory for temporarily storing data read out from the data memory, an external device for transmitting a command message to the portable data storage medium and receiving a response message from the portable data storage medium; and
a control section for controlling the readout of data from the data memory and the transmission of data in the temporary memory to the external device, a method for data transmission between the portable data storage medium and the external device comprising the steps of:
a first transmission step in which data is read out from the data memory in response to a readout command message supplied from the external device, and a status data item representative of the result of the readout, a data item representation of data length and a data item read out from the data memory are transmitted to the external device via the temporary memory;
a second transmission step in which a continuous data demand command is transmitted to the portable data storage medium, when the external device judges that there is a continuous data item from the data sent to the external device in the first transmission step and from the data item representative data length;
a third transmission step in which the portable data storage medium, which has received the continuous data demand command from the external device in the second transmission step, reads out a continuous data item from the data memory and a transmits the readout data to the external device via the temporary memory;
a fourth transmission step in which a data discontinuation message is output from the portable data storage medium device to the external device, when an abnormality occurs during the readout from the data memory in the third step; and
a fifth transmission step in which, subsequent to the data discontinuation message output in the fourth transmission step, a status data item different from a status data item output at the time of normal readout is output from the portable data storage medium to the external device.

14. The method according to claim 13, wherein the data discontinuation message consists of a message start data item, a data item and a message end data item, and the abnormality response is a delimiter message consisting of a message start data and a message end data.

* * * * *